United States Patent
Sakimoto et al.

(10) Patent No.: US 9,833,856 B2
(45) Date of Patent: Dec. 5, 2017

(54) CIRCUMFERENTIAL WELDED JOINT OF LINE PIPE, METHOD OF FORMING CIRCUMFERENTIAL WELDED JOINT OF LINE PIPE, AND LINE PIPE

(71) Applicant: JFE STEEL CORPORATION, Tokyo (JP)

(72) Inventors: Takahiro Sakimoto, Tokyo (JP); Satoshi Igi, Tokyo (JP); Tomoyuki Yokota, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 224 days.

(21) Appl. No.: 14/647,993

(22) PCT Filed: Nov. 19, 2013

(86) PCT No.: PCT/JP2013/081092
§ 371 (c)(1),
(2) Date: May 28, 2015

(87) PCT Pub. No.: WO2014/084084
PCT Pub. Date: Jun. 5, 2014

(65) Prior Publication Data
US 2015/0328708 A1 Nov. 19, 2015

(30) Foreign Application Priority Data
Nov. 29, 2012 (JP) ................................ 2012-260455

(51) Int. Cl.
*B23K 9/028* (2006.01)
*B23K 31/02* (2006.01)
(Continued)

(52) U.S. Cl.
CPC .......... *B23K 9/0282* (2013.01); *B23K 9/0026* (2013.01); *B23K 9/186* (2013.01);
(Continued)

(58) Field of Classification Search
CPC .. B23K 9/18–9/188; B23K 2201/04–2201/125
(Continued)

(56) References Cited

U.S. PATENT DOCUMENTS

| 6,336,583 B1* | 1/2002 | Wang ................ B23K 31/02 228/175 |
| 8,637,166 B2 | 1/2014 | Ayer |
| 2010/0021761 A1 | 1/2010 | Ayer |

FOREIGN PATENT DOCUMENTS

| CN | 1871094 A | 11/2006 |
| CN | 101945724 A | 1/2011 |

(Continued)

OTHER PUBLICATIONS

International Search Report PCT/JP2013/081092 dated Feb. 4, 2014.
(Continued)

*Primary Examiner* — Craig Schneider
*Assistant Examiner* — David Deal
(74) *Attorney, Agent, or Firm* — Young & Thompson

(57) ABSTRACT

A circumferential welded joint of a line pipe is formed by butting against each other end portions of steel pipes having a yield strength according to 5L Specification of API Standards not smaller than 555 N/mm² and welding the butted portions in a circumferential direction. A joint strength ratio $\sigma_{match} = (TS\text{-}w/TS\text{-}b) \cdot (YS\text{-}w/YS\text{-}b)$ represented by a product of a ratio between a tensile strength TS-w of a weld metal and a tensile strength TS-b of a base material and a ratio between a yield strength YS-w of the weld metal and a yield strength YS-b of the base material, and a critical equivalent plastic strain $\epsilon_{p\text{-}cri}$ [%] for ductile crack generation in a base material heat affected zone satisfy Equation (1), and the yield strengths YS-w, YS-b of the weld metal and base material satisfy Equation (2).

$$\sigma_{match} > 4.85 \epsilon_{p\text{-}cri}^{-0.31} \quad (1)$$

$$\text{YS-}w/\text{YS-}b \geq 1.0 \quad (2)$$

5 Claims, 1 Drawing Sheet

(51) Int. Cl.
  *B23K 9/23* (2006.01)
  *B23K 9/00* (2006.01)
  *B23K 9/18* (2006.01)
  *B23K 101/10* (2006.01)
  *B23K 103/04* (2006.01)

(52) U.S. Cl.
  CPC ............... *B23K 9/23* (2013.01); *B23K 31/02* (2013.01); *B23K 2201/10* (2013.01); *B23K 2203/04* (2013.01); *Y10T 403/479* (2015.01)

(58) Field of Classification Search
  USPC .................................. 138/177, 155; 219/73
  See application file for complete search history.

(56) References Cited

FOREIGN PATENT DOCUMENTS

| JP | S5334644 | 3/1978 |
|---|---|---|
| JP | S5758984 A | 4/1982 |
| JP | 2004-148389 | 5/2004 |
| JP | 2005279743 A | 10/2005 |
| JP | 2012-032333 | 2/2012 |
| JP | 2013-039605 | 2/2013 |
| RU | 2155655 C2 | 9/2000 |
| RU | 2425737 C2 | 8/2011 |
| WO | 2009078982 A2 | 6/2009 |

OTHER PUBLICATIONS

Nobuyuki Ishikawa et al., "Ductile Cracking Criterion for High Strength Linepipe Girth Welds and Strain-Base Design", Quarterly Journal of the Japan Welding Society, vol. 23, No. 2, Japan Welding Society, 2005, pp. 311 to 318.

Satoshi Igi et al., 'Tensile Strain Capacity of X80 Pipeline Under Tensile Loading With Internal Pressure', In: Proceedings of the Biennial International Pipeline Conference, 8th International Pipeline Conference, vol. 4, American Society of Mechanical Engineers, New Your , 2010, p. 91-100.

Chinese Office Action dated Jun. 27, 2016, Application No. 201380061972.5.

Russian Office Action dated Aug. 1, 2016; Application No. 2015120283.

* cited by examiner

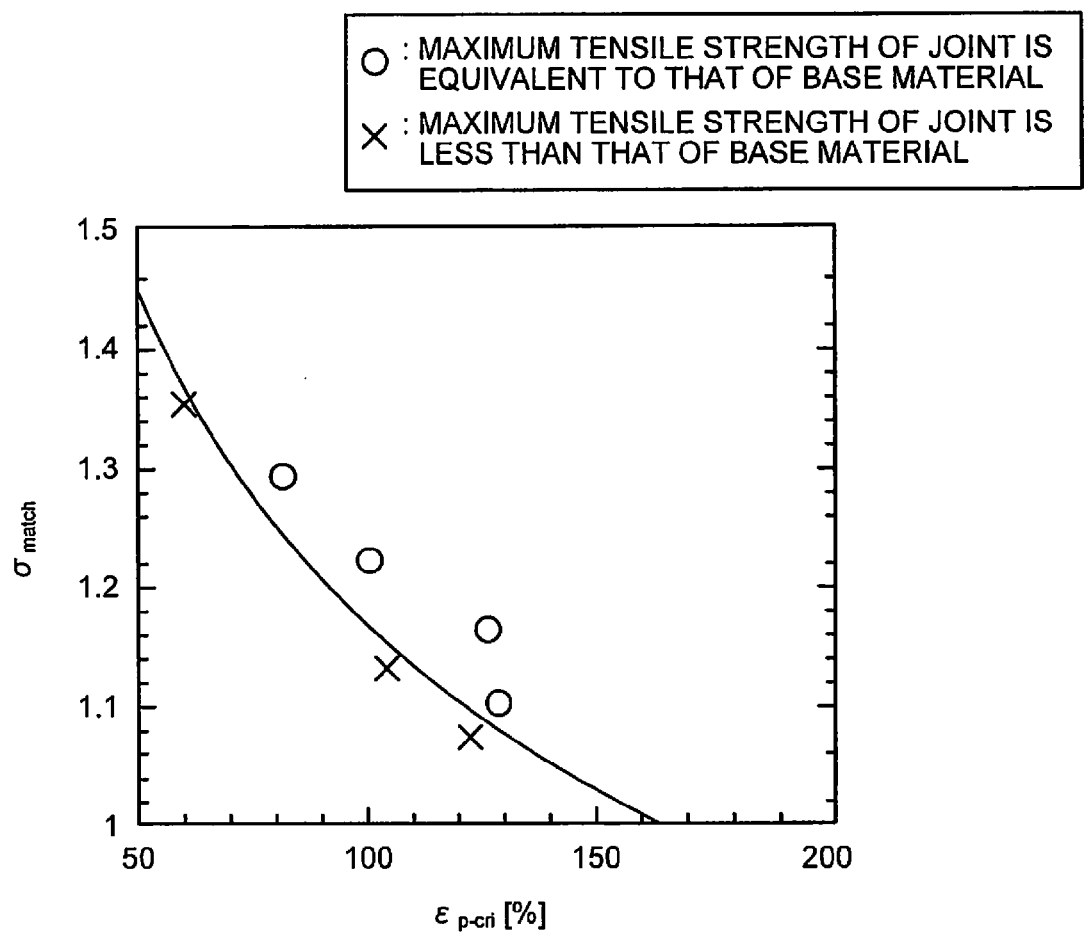

CIRCUMFERENTIAL WELDED JOINT OF LINE PIPE, METHOD OF FORMING CIRCUMFERENTIAL WELDED JOINT OF LINE PIPE, AND LINE PIPE

FIELD

The present invention relates to: a circumferential welded joint of a high strength line pipe having a yield strength (American Petroleum Institute (API) Standards, 5L Specification) equal to or greater than 555 N/mm$^2$; a method of forming the circumferential welded joint of the line pipe; and the line pipe.

BACKGROUND

Steel pipes used for pipe lines that transport natural gas or petroleum have been strengthened in order to improve transport efficiency by increase in operating pressure. In pipe lines laid in seismic areas and frozen ground areas, large plastic deformation may be caused by external force due to ground deformation. In pipe lines with plastic deformation having occurred therein, ductile fracture may occur by ductile cracks being generated and progressing from defects latent in parts of circumferential welded portions and the like or by necking occurring in base material portions.

Conventionally, in designing a welded joint, in order to prevent deformation and strain from centralizing in a welded joint portion from the viewpoint of prevention of brittle fracture, based on making higher (overmatching) the yield strength and tensile strength of a weld metal than those of the base material, overmatching of about 110% to 120% as compared to the base material has been demanded (see the "Embodiments of Invention" section of Patent Literature 1). However, recently, steels having sufficient brittle fracture characteristics are used for pipe lines used in regions where large ground deformation occurs, and ductile fracture is the form of fracture that has been problematic. Nevertheless, when a weld metal is selected, regardless of the form of fracture, joint designing is actually done such that overmatching of 110% or greater as compared to the base material yield strength and base material tensile strength is achieved.

CITATION LIST

Patent Literature 1: Japanese Laid-open Patent Publication No. 2004-148389

SUMMARY

Technical Problem

However, still keeping on applying the conventional overmatching designed from the viewpoint of prevention of brittle fracture even in a case where ductile fracture is the problematic form of fracture may have the risk of providing designs that are excessively on the safe side.

Further, conventionally, when line pipes are circumferentially welded, the line pipes are generally joined by a welding method, such as gas shield metal arc welding (GMAW) at a place where the line pipes are laid. However, recently, from the viewpoint of increasing efficiency for cost reduction, a method of joining two line pipes by welding at a factory in advance and transporting the line pipes to a place where the line pipes are laid is sometimes implemented. For such welding at a factory, in order to perform circumferential welding, instead of the gas shield metal arc welding, submerged arc welding, which enables welding of higher efficiency, is sometimes used. However, when circumferential welding is performed by the submerged arc welding and the maximum heat input is 40000 J/cm, with respect to a base material of X80 grade of the API standards, formation of a welded joint achieving overmatching of 110% or greater as compared to the base material yield strength without causing weld cracks is difficult.

The present invention has been made in order to solve the above problems, and aims to provide a circumferential welded joint of a line pipe, a method of forming the circumferential welded joint of the line pipe, and the line pipe, which are able to ensure a joint strength equivalent to a base material tensile strength when end portions of high strength steel pipes used for line pipes are butted against each other and circumferential welding is performed along the end portions.

Solution to Problem

A circumferential welded joint of a line pipe according to the present invention is formed by butting against each other end portions of steel pipes having a yield strength according to 5L Specification of API Standards not smaller than 555 N/mm$^2$ and welding the butted portions in a circumferential direction, a joint strength ratio $\sigma_{match}$=(TS-w/TS-b)·(YS-w/YS-b) represented by a product of a ratio (TS-w/TS-b) between a tensile strength TS-w of a weld metal and a tensile strength TS-b of a base material and a ratio (YS-w/YS-b) between a yield strength YS-w of the weld metal and a yield strength YS-b of the base material, and a critical equivalent plastic strain $\epsilon_{p\text{-}cri}$ [%] for ductile crack generation in a base material heat affected zone satisfy Equation (1), and the yield strength YS-w of the weld metal and the yield strength YS-b of the base material satisfy Equation (2).

$$\sigma_{match} > 4.85 \epsilon_{p\text{-}cri}^{-0.31} \quad (1)$$

$$\text{YS-}w/\text{YS-}b \geq 1.0 \quad (2)$$

In the circumferential welded joint of the line pipe according to the present invention, the circumferential welded joint is formed by a submerged arc welding method in which a one pass per layer laminating method is used and a welding heat input amount per pass is not smaller than 8000 J/cm.

A method of forming a circumferential welded joint of a line pipe according to the present invention is a method of forming a circumferential welded joint of a line pipe by butting against each other end portions of steel pipes having a yield strength according to 5L Specification of API Standards not smaller than 555 N/mm$^2$ and welding the butted portions in a circumferential direction, wherein the welding is implement by selecting a weld material and weld conditions such that: a joint strength ratio $\sigma_{match}$=(TS-w/TS-b)·(YS-w/YS-b) represented by a product of a ratio (TS-w/TS-b) between a tensile strength TS-w of a weld metal and a tensile strength TS-b of a base material and a ratio (YS-w/YS-b) between a yield strength YS-w of the weld metal and a yield strength YS-b of the base material, and a critical equivalent plastic strain $\epsilon_{p\text{-}cri}$ [%] for ductile crack generation in a base material heat affected zone satisfy Equation (1); and the yield strength YS-w of the weld metal and the yield strength YS-b of the base material satisfy Equation (2).

$$\sigma_{match} > 4.85 \epsilon_{p\text{-}cri}^{-0.31} \quad (1)$$

$$\text{YS-}w/\text{YS-}b < 1.0 \quad (2)$$

In the method of forming the circumferential welded joint of the line pipe according to the present invention, the welding is implemented by a submerged arc welding method in which a one pass per layer laminating method is used and a welding heat input amount per pass is not smaller than 8000 J/cm.

A line pipe according to the present invention includes a base material heat affected zone whose critical equivalent plastic strain $\epsilon_{p\text{-}cri}$ [%] for ductile crack generation satisfies Equation (1), wherein a yield strength according to 5L Specification of the API Standards is not smaller than 555 N/mm$^2$.

$$\sigma_{match} > 4.85 \epsilon_{p\text{-}cri} \tag{1}$$

Advantageous Effects of Invention

According to the present invention, even if a defect is present in a part of a circumferential welded joint portion or the like, the circumferential welded joint portion as a whole is able to ensure a joint strength equivalent to a tensile strength of the base material, and a circumferential welded joint of a line pipe satisfying a reasonable and required strength is able to be provided.

BRIEF DESCRIPTION OF DRAWINGS

FIG. 1 is a graph illustrating results of experiments in working examples for explaining effects of the present invention.

DESCRIPTION OF EMBODIMENTS

In a circumferential welded joint portion of a pipe line in which large plastic deformation is caused by an external force due to ground deformation, even if a defect is present in a part of the circumferential welded joint portion or the like, the circumferential welded joint portion as whole just needs to ensure a joint strength equivalent to a tensile strength of the base material. The inventor investigated a relation between ductile fracture performance of a joint and matching when a maximum defect allowed under standards is present in a circumferential welded joint portion. As a result, the inventor has newly found that if a joint strength of a circumferential welded joint portion that does not undergo brittle fracture has a certain generation resistance or more against a ductile crack, the yield strength thereof does not always need to achieve the conventional overmatching of 110% or greater. The present invention is based on that finding.

A circumferential welded joint of a line pipe according to an embodiment of the present invention is a circumferential welded joint of a line pipe, which is formed by butting end portions of steel pipes having a yield strength (API Standards, 5L Specification) equal to or greater than 555 N/mm$^2$ against each other and welding the butted portions in a circumferential direction, and the circumferential welded joint is characterized in that a joint strength ratio $\sigma_{match}$= (TS-w/TS-b)·(YS-w/YS-b) represented by a product of a ratio (TS-w/TS-b) between a tensile strength TS-w of a weld metal and a tensile strength TS-b of a base material and a ratio (YS-w/YS-b) between a yield strength YS-w of the weld metal and a yield strength YS-b of the base material, and a critical equivalent plastic strain $\epsilon_{p\text{-}cri}$ [%] for ductile crack generation in a base material heat affected zone satisfy Equation (1), and the yield strength YS-w of the weld metal and the yield strength YS-b of the base material satisfy Equation (2).

$$\sigma_{match} > 4.85 \epsilon_{p\text{-}cri} \tag{1}$$

$$\text{YS-}w/\text{YS-}b \geq 1.0 \tag{2}$$

As described above, conventionally, in designing a welded joint, in order to prevent deformation and strain from centralizing in a welded joint portion from the viewpoint of prevention of brittle fracture, based on making higher a strength of a weld metal than a strength of a base material, the weld metal has been selected such that overmatching of 110% or greater as compared to a yield strength and a tensile strength of the base material is achieved. However, if a steel pipe having a yield strength (API standards, 5L Specification) equal to or greater than 555 N/mm$^2$ has sufficient brittle fracture characteristics, the welded joint portion does not undergo brittle fracture. It has been found that a welded joint that does not undergo brittle fracture demonstrates, as the whole welded joint, a joint strength equivalent to that of the base material without being fractured, as long as the welded joint satisfies Equation (1) represented by a relation between a joint strength ratio $\sigma_{match}$ represented by a product of a ratio between a tensile strength of the weld metal and a tensile strength of the base material and a ratio between a yield strength of the weld metal and a yield strength of the base material, and a critical equivalent plastic strain $\epsilon_{p\text{-}cri}$ [%] for ductile crack generation in a base material heat affected zone, and Equation (2) indicating that the yield strength of the weld metal is equal to or greater than the yield strength of the base material. That is, in the welded joint that does not undergo brittle fracture, by having a fracture resistance against a ductile crack satisfying Equation (1), growth of the ductile crack is suppressed and the welded joint as a whole does not undergo fracture, and by satisfying Equation (2), the welded joint as a whole is able to have a joint strength equivalent to that of the base material. More preferably, the value of YS-w/YS-b is equal to or greater than "1.05".

A generation resistance against a ductile crack is able to be identified by a single edge notch tension (SENT) test in the pipe line field. This point is also described in the following paper demonstrating that generation of a ductile crack when a welded portion of a real steel pipe has a defect is able to be predicted and evaluated with critical equivalent plastic strain $\epsilon_{p\text{-}cri}$ for ductile crack generation obtained by a SENT test: "TENSILE STRAIN CAPACITY OF X80 PIPELINE UNDER TENSILE LOADING WITH INTERNAL PRESSURE", S. Igi, Proceedings of the 8th International Pipeline Conference, IPC 2010-31281.

According to the present invention, the critical equivalent plastic strain $\epsilon_{p\text{-}cri}$ for ductile crack generation in a base material heat affected zone obtained by this technique is the generation resistance against a ductile crack. Further, the joint strength ratio $\sigma_{match}$ prescribes a matching ratio for each of the yield stress and tensile strength and is represented by (TS-w/TS-b)·(YS-w/YS-b) if the ratio between the tensile strength TS-w of the weld metal and the tensile strength TS-b of the base material is (TS-w/TS-b), and the ratio between the yield strength YS-w of the weld metal and the yield strength YS-b of the base material is (YS-w/YS-b).

By using steel pipes having a yield strength (API standards, 5L Specification) equal to or greater than 555 N/mm$^2$ and having various critical equivalent plastic strains $\epsilon_{p\text{-}cri}$ for ductile crack generation in the base material heat affected zones and using weld materials set such that weld metals achieved matching variously, welded joints were formed and their joint strengths were evaluated by a wide-width tensile test. In the wide-width tensile test, at a boundary between the welded portion and the base material portion, a surface defect having 25 mm of an allowable maximum defect length described in API Standards 1104 (a surface defect of incomplete fusion or the like) and 3 mm of an allowable maximum defect depth described in guidelines of the European Pipeline Research Group (EPRG) is introduced.

Results of comparing maximum tensile strengths of welded joint portions with tensile strengths of their base materials are illustrated in Table 1 and FIG. 1, the welded joint portions being manufactured by: preparing steel pipes of a steel type of X80 grade of the API standards 5L, the steel pipes having plate thicknesses from 12.3 mm to 38.2 mm; and performing circumferential submerged arc welding (double joint welding) of line pipes with the welding heat input amount per pass equal to or greater than 8000 J/cm using a one pass per layer laminating method.

TABLE 1

|  | No. | Steel Type | Plate Thickness [mm] | $\epsilon_{p\text{-}cri}$ [%] | TS-w/ TS-b | YS-w/ YS-b | $\sigma_{match}$ | $4.85\epsilon_{p\text{-}cri}^{-0.31}$ | $\sigma_{max\text{-}J}/\sigma_{max\text{-}B}$ |
|---|---|---|---|---|---|---|---|---|---|
| Invention Example | 1 | X80 | 12.3 | 82 | 1.23 | 1.05 | 1.29 | 1.24 | 1.0 |
|  | 2 | X80 | 23.7 | 128 | 1.10 | 1.00 | 1.10 | 1.08 | 1.0 |
|  | 3 | X80 | 23.7 | 126 | 1.12 | 1.04 | 1.16 | 1.08 | 1.0 |
|  | 4 | X80 | 38.2 | 100 | 1.13 | 1.08 | 1.22 | 1.16 | 1.0 |
| Comparative Example | 5 | X80 | 23.7 | 104 | 1.12 | 1.01 | 1.13 | 1.15 | 0.8 |
|  | 6 | X80 | 23.7 | 122 | 1.06 | 1.01 | 1.07 | 1.09 | 0.8 |
|  | 7 | X80 | 12.3 | 60 | 1.22 | 1.11 | 1.35 | 1.36 | 0.7 |

As a result of the evaluation of the joint strengths, it has been found that even if the maximum surface defect allowed under the standards is present, the welded joint as a whole demonstrates a joint strength equivalent to a tensile strength of the base material without being fractured, as long as Equation (1) and Equation (2) are satisfied, Equation (1) being expressed by a relation between a joint strength ratio $\sigma_{match}$, which is represented by a product of a ratio between a tensile strength of the weld metal and a tensile strength of the base material and a ratio between a yield strength of the weld metal and a yield strength of the base material, and a critical equivalent plastic strain $\epsilon_{p\text{-}cri}$ for ductile crack generation in a base material heat affected zone, and Equation (2) indicating that the yield strength of the weld metal is equal to or greater than the yield strength of the base material.

Even if large plastic deformation occurs by an external force due to ground deformation, since the above described welded joint demonstrates a tensile strength and elongation characteristics equivalent to those of the base material, without excessive overmatching for the yield strength of the weld metal being demanded, reasonable joint designing is possible. Further, although a plate thickness of the steel plate is not particularly limited, the present invention is preferably applied to high strength steel pipes having a plate thickness greater than 0.5 inches (12.3 mm), for example. This is because when the plate thickness is thin, the maximum allowable defect depth, 3 mm, becomes large relatively to the plate thickness and brittle fracture may occur.

Working Examples

Experiments to confirm the effects of the present invention were performed, and thus will be described hereinafter. Conditions in the working examples are just an example of conditions adopted in order to confirm the enablement and effects of the present invention and thus the present invention is not to be limited to this one example of conditions. The present invention may adopt various conditions and combinations of the conditions without departing from the substance of the present invention and as long as the object of the present invention is achieved.

Maximum tensile strengths of the welded joints were found by a tensile test of wide-width tensile test bodies including the welded joint portions. Dimensions in the wide-width tensile test were a width of 300 mm, a parallel portion length of 1350 mm, and the original thickness as it is. Further, the maximum tensile strength of the welded joint was assumed to be a value where the stress indicates the maximum point from a relation between a tensile strain and a tensile load calculated from a pulling direction displacement of 900 mm between reference marks (three times the width) and a stress calculated from an initial cross sectional area.

In Table 1, $\epsilon_{p\text{-}cri}$ is the critical equivalent plastic strain $\epsilon_{p\text{-}cri}$ for ductile crack generation in a heat affected zone of a target base material and was measured by a technique similar to the technique described in Non-Patent Literature 1. Further, the yield strengths and tensile strengths of the base materials and weld metals were measured in accordance with Standards A370 of the American Society for Testing and Materials (ASTM).

In FIG. 1, the vertical axis represents the joint strength ratio $\sigma_{match}$ and the horizontal axis represents the critical equivalent plastic strain $\epsilon_{p\text{-}cri}$ for ductile crack generation. The curve in FIG. 1 is expressed by Equation (3) below.

$$\sigma_{match} = 4.85\epsilon_{p\text{-}cri}^{-0.31} \qquad (3)$$

Therefore, the range above the curve in FIG. 1 is a range satisfying Equation (1). In FIG. 1, values of the joint strength ratio $\sigma_{match}$ of the invention examples (No. 1 to No. 4) and comparative examples (No. 5 to No. 7) are plotted, and the circle marks represent the invention examples (No. 1 to No. 4) and the cross marks represent the comparative examples (No. 5 to No. 7). As illustrated in FIG. 1, all of the joint strength ratios $\sigma_{match}$ of the invention examples (No. 1 to No. 4) are above the curve and all of the joint strength ratios $\sigma_{match}$ of the comparative examples (No. 5 to No. 7) are below the curve. That is, all of the invention examples (No. 1 to No. 4) satisfy Equation (1) and conversely, the comparative examples (No. 5 to No. 7) do not satisfy Equation (1). Further, as evident from Table 1, both of the invention examples (No. 1 to No. 4) and comparative examples (No. 5 to No. 7) satisfy Equation (2).

As illustrated by Table 1, for each of the invention examples (No. 1 to No. 4), which satisfy Equation (1) and Equation (2), the ratio $\sigma_{max\text{-}J}/\sigma_{max\text{-}B}$ between the maximum tensile strength $\sigma_{max\text{-}J}$ of the welded joint portion and the maximum tensile strength $\sigma_{max\text{-}B}$ of the base material is "1.0" and the maximum tensile strength of the welded joint portion has performance equivalent to the maximum tensile strength of the base material. The invention examples (No. 1 to No. 4) achieve overmatching of about 110% to 120% as compared to the base material tensile strengths while achieving overmatching of 108% or less as compared to the base material yield strengths. In contrast, the comparative examples (No. 5 to No. 7) do not satisfy Equation (1), fracture occurs before the welded joint portions are sufficiently deformed, and the maximum tensile strengths of the welded joint portions became 80% or less of the maximum tensile strengths of the base materials. In particular, for the comparative example (No. 7), both the yield strength and tensile strength achieve overmatching of 110% or greater but since resistance against a ductile crack is low, sufficient joint strength is not demonstrated.

As described above, the performance of the maximum tensile strengths of the welded joint portions of the welded joints of the invention examples is equivalent to that of the maximum tensile strengths of the base materials and since the welded joints of the invention examples achieve overmatching of 108% or less as compared to the base material yield strengths, the welded joints have been verified to be welded joints having reasonable and sufficient strengths. In the above described working examples, effectiveness of the present invention has been confirmed for the steel pipes having a plate thickness of 12.3 mm or greater, but this does not mean that the plate thickness according to the present invention is limited.

INDUSTRIAL APPLICABILITY

According to the present invention, even if a defect is present in a circumferential welded joint portion or the like, the circumferential welded joint portion as a whole is able to ensure a joint strength equivalent to that of the tensile strength of the base material and a circumferential welded joint of a line pipe satisfying a reasonable and required strength is able to be provided.

The invention claimed is:

1. A circumferential welded joint of a line pipe, comprising:
    steel pipes having a yield strength not smaller than 555 N/mm$^2$, the steel pipes serving as a base material of the circumferential welded joint, being butted against each other at butted end portions, and including a base material heat affected zone; and
    a weld metal located at the butted end portions along a circumferential direction, wherein a weld material and weld conditions are selected such that:
    a joint strength ratio $\sigma_{match}=(TS\text{-}w/TS\text{-}b)\cdot(YS\text{-}w/YS\text{-}b)$ represented by a product of a ratio (TS-w/TS-b) between a tensile strength TS-w of the weld metal and a tensile strength TS-b of the base material and a ratio (YS-w/YS-b) between a yield strength YS-w of the weld metal and a yield strength YS-b of the base material, and a critical equivalent plastic strain $\epsilon_{p\text{-}cri}$ [%] for ductile crack generation in the base material heat affected zone satisfy Equation (1), and
    the yield strength YS-w of the weld metal and the yield strength YS-b of the base material satisfy Equation (2)

$$\sigma_{match} > 4.85\epsilon_{p\text{-}cri}^{-0.31} \tag{1}$$

$$YS\text{-}w/YS\text{-}b \geq 1.0 \tag{2}.$$

2. The circumferential welded joint of the line pipe according to claim 1, wherein the circumferential welded joint is formed by a submerged arc welding method in which a one pass per layer laminating method is used and a welding heat input amount per pass is not smaller than 8000 J/cm.

3. A method of forming a circumferential welded joint of a line pipe, comprising:
    butting against each other end portions of steel pipes having a yield strength not smaller than 555 N/mm$^2$; and
    welding the butted portions in a circumferential direction, wherein
    the welding is implemented by selecting a weld material and weld conditions such that:
    a joint strength ratio $\sigma_{match}=(TS\text{-}w/TS\text{-}b)\cdot(YS\text{-}w/YS\text{-}b)$ represented by a product of a ratio (TS-w/TS-b) between a tensile strength TS-w of a weld metal and a tensile strength TS-b of a base material and a ratio (YS-w/YS-b) between a yield strength YS-w of the weld metal and a yield strength YS-b of the base material, and a critical equivalent plastic strain $\epsilon_{p\text{-}cri}$ [%] for ductile crack generation in a base material heat affected zone satisfy Equation (1); and
    the yield strength YS-w of the weld metal and the yield strength YS-b of the base material satisfy Equation (2)

$$\sigma_{match} > 4.85\epsilon_{p\text{-}cri}^{-0.31} \tag{1}$$

$$YS\text{-}w/YS\text{-}b \geq 1.0 \tag{2}.$$

4. The method of forming the circumferential welded joint of the line pipe according to claim 3, wherein the welding is implemented by a submerged arc welding method in which a one pass per layer laminating method is used and a welding heat input amount per pass is not smaller than 8000 J/cm.

5. A line pipe, comprising:
    a base material heat affected zone whose critical equivalent plastic strain $\epsilon_{p\text{-}cri}$ [%] for ductile crack generation satisfies Equation (1), wherein
    a yield strength is not smaller than 555 N/mm$^2$ $$\sigma_{match} > 4.85\epsilon_{p\text{-}cri}^{-0.31} \tag{1},$$

where $\sigma_{match}=(TS\text{-}w/TS\text{-}b)\cdot(YS\text{-}w/YS\text{-}b)$ represented by a product of a ratio (TS-w/TS-b) between a tensile strength TS-w of a weld metal and a tensile strength TS-b of a base material and a ratio (YS-w/YS-b) between a yield strength YS-w of the weld metal and a yield strength YS-b of the base material.

* * * * *